United States Patent [19]

Maniar et al.

[11] Patent Number: 4,594,654
[45] Date of Patent: Jun. 10, 1986

[54] CIRCUIT FOR CONTROLLING EXTERNAL BIPOLAR BUFFERS FROM AN MOS PERIPHERAL DEVICE

[75] Inventors: Mohammad Y. Maniar; Steven Dines, both of San Jose, Calif.

[73] Assignee: Advanced Micro Devices, Inc., Sunnyvale, Calif.

[21] Appl. No.: 549,521

[22] Filed: Nov. 4, 1983

[51] Int. Cl.⁴ .......................... G06F 3/00; G06F 9/22; G06F 13/42
[52] U.S. Cl. .................................................. 364/200
[58] Field of Search ................ 364/200 MS, 900 MS; 179/175.2 R

[56] References Cited

U.S. PATENT DOCUMENTS

| | | | |
|---|---|---|---|
| 3,374,465 | 3/1968 | Richmond et al. | 364/200 |
| 4,047,201 | 9/1977 | Kerllenevich | 364/200 |
| 4,200,916 | 4/1980 | Seipp | 364/900 |
| 4,319,338 | 3/1982 | Grudowski et al. | 364/900 |
| 4,453,229 | 6/1984 | Schaire | 364/900 |
| 4,528,626 | 7/1985 | Dean et al. | 364/200 |

Primary Examiner—Harvey E. Springborn
Attorney, Agent, or Firm—Patrick T. King; Eugene H. Valet; Gary T. Aka

[57] ABSTRACT

A circuit for controls external bipolar buffers for an MOS peripheral device capable of operating in master end slave modes. The circuit provides for a slave mode logic block and a master mode logic block for generating a DATA TRANSMIT ENABLE SIGNAL to permit the bipolar buffer to transmit data signals from the peripheral device to a system bus. The circuit also provides for a second slave mode logic block and a master mode logic block for generating a DATA RECEIVE ENABLE block to permit the bipolar buffer to transmit data signals from the system bus to the peripheral device. Each slave mode logic block is responsive to condiion signals, such as CHIP SELECT and READ/WRITE. Each master mode logic block is responsive to timing signals and signals generated internally within the periphel device so that the master mode DATA RECEIVE and DATA TRANSMIT signals occur only in predetermined timing cycles.

8 Claims, 13 Drawing Figures

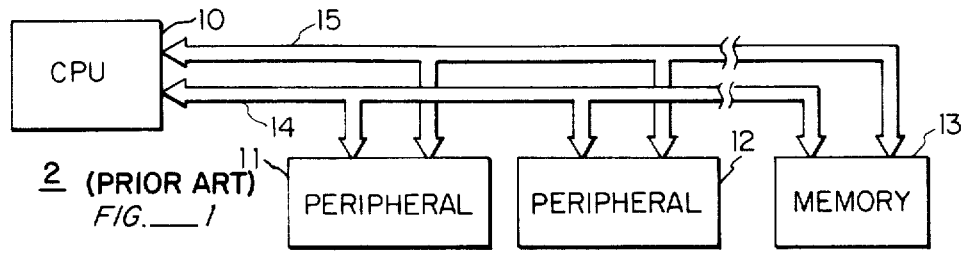
FIG.—1 (PRIOR ART)
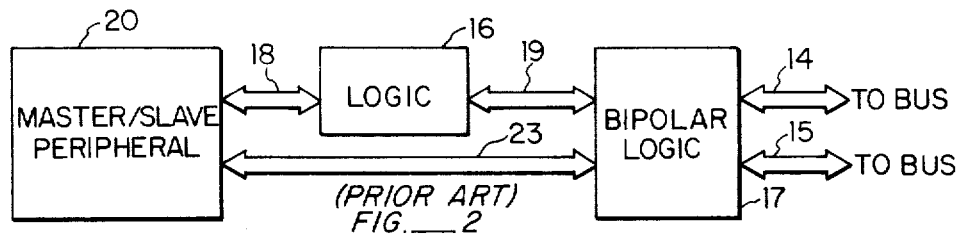
FIG.—2 (PRIOR ART)
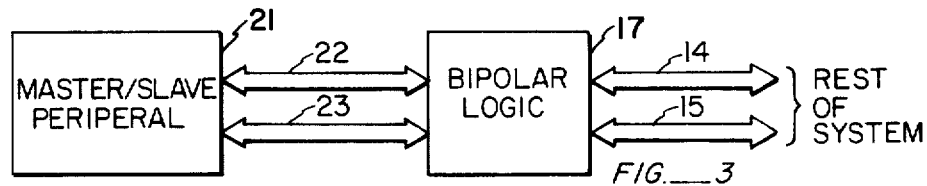
FIG.—3
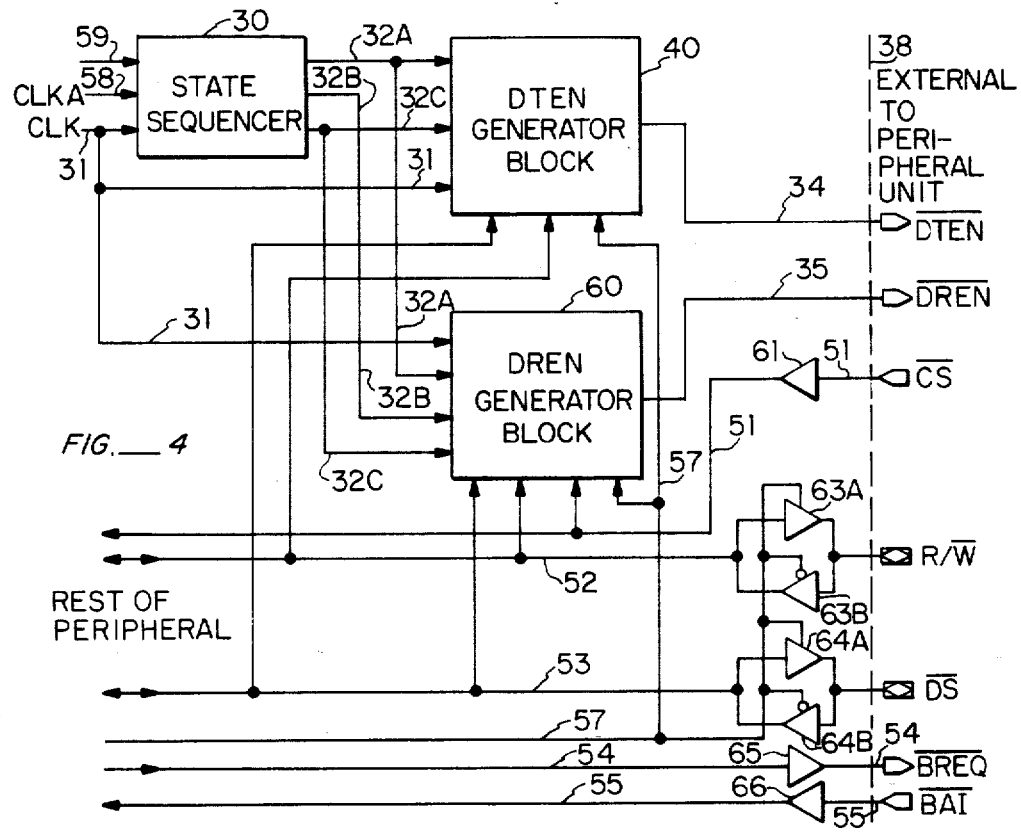
FIG.—4

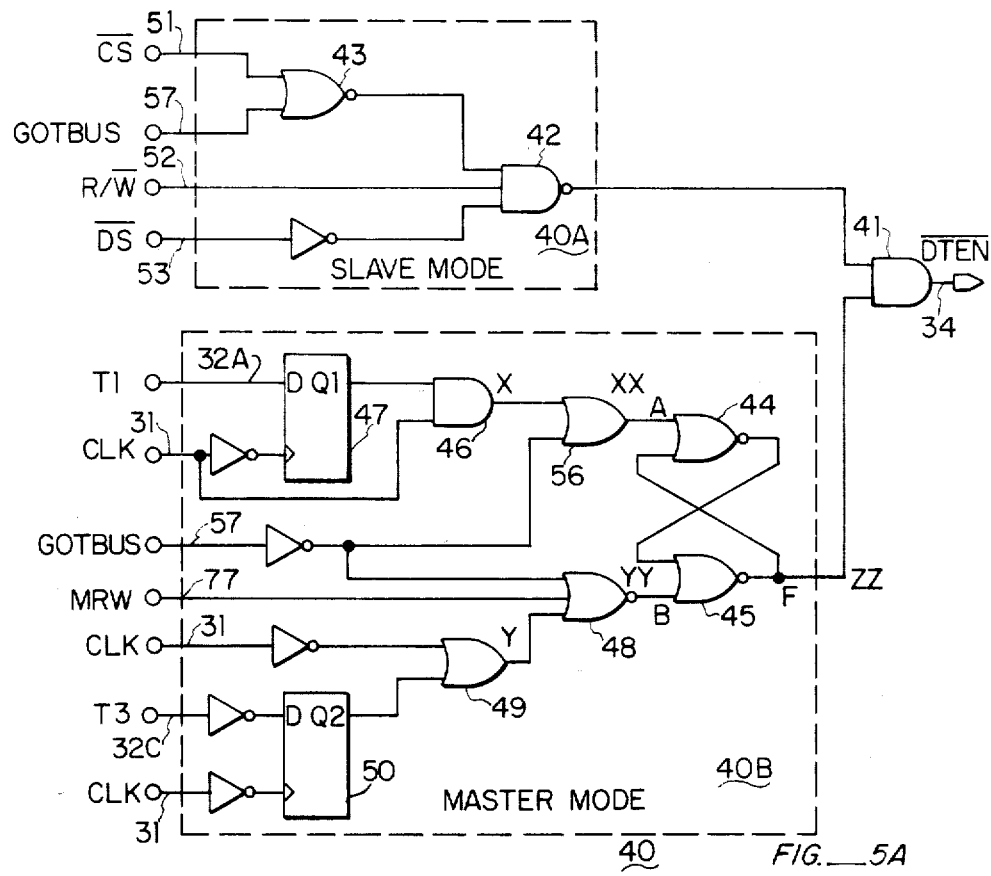
FIG._5A
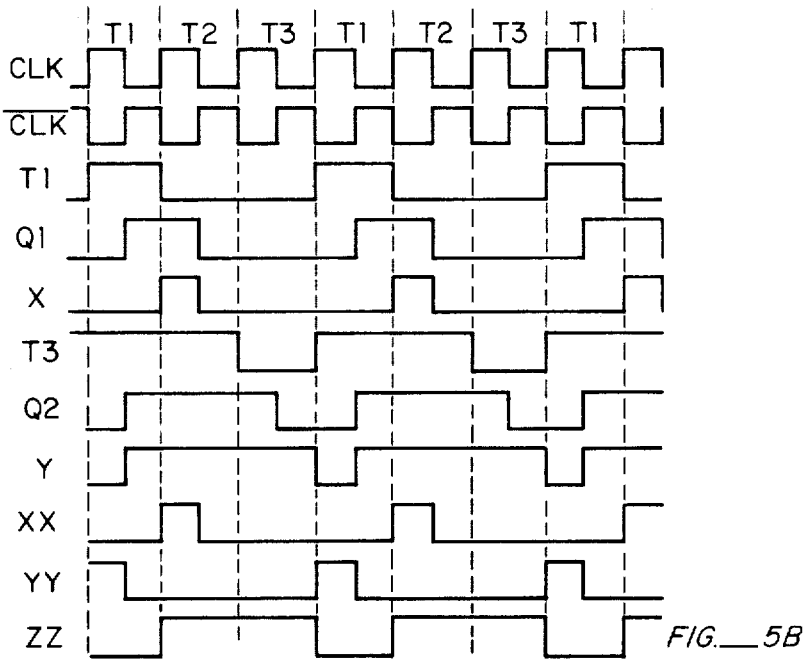
FIG._5B

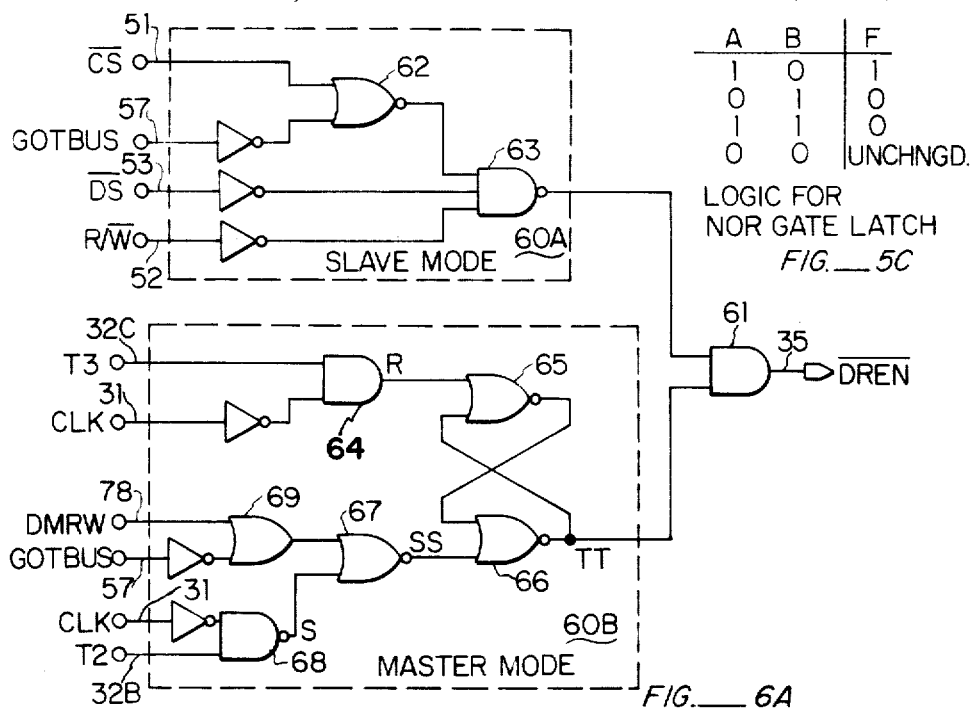
FIG._6A
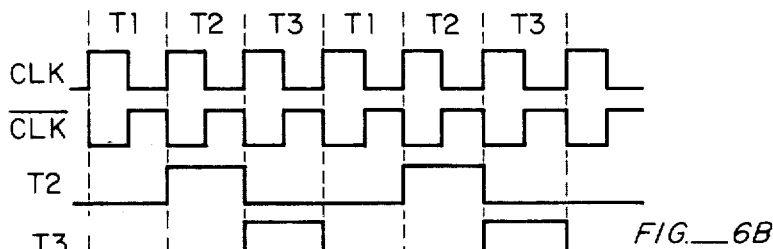
FIG._6B
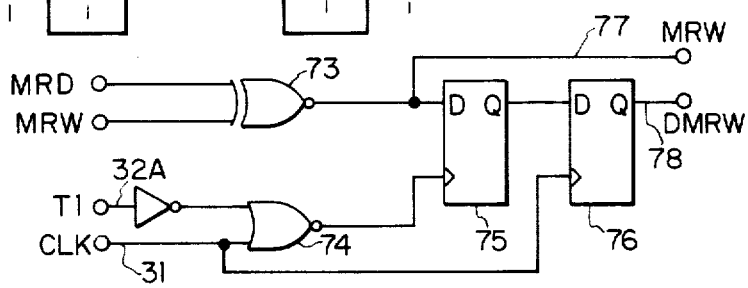
FIG._7

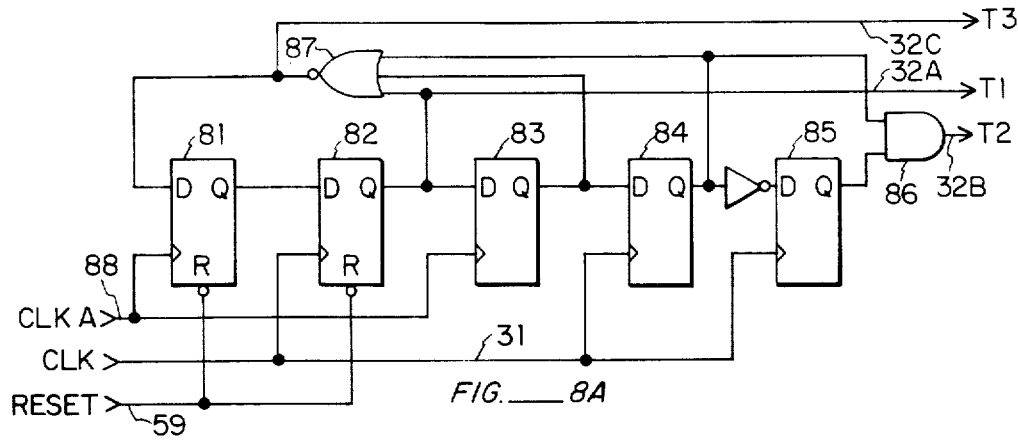
FIG._8A
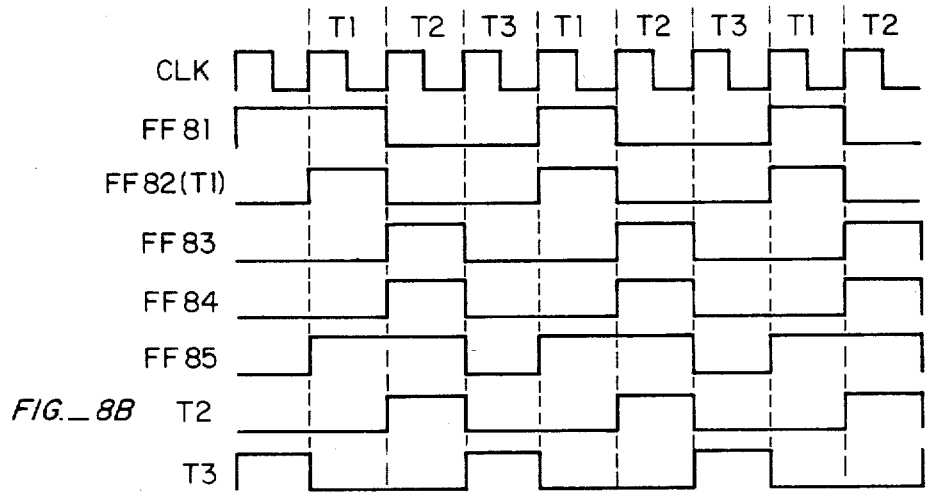
FIG._8B
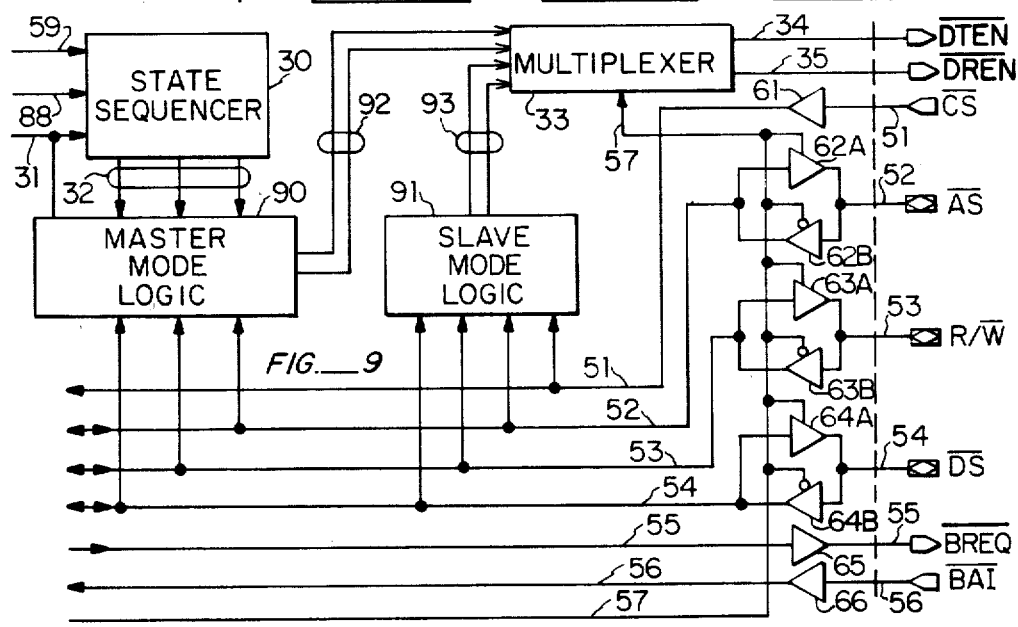
FIG._9

CIRCUIT FOR CONTROLLING EXTERNAL BIPOLAR BUFFERS FROM AN MOS PERIPHERAL DEVICE

BACKGROUND OF THE INVENTION

1. Field of the Invention

This invention relates to electronic interface control circuitry and, more particularly, to circuitry for controlling the bipolar buffers of MOS peripheral devices in a microcomputer system.

2. Description of the Prior Art

In a microcomputer system there is typically a central processing unit (CPU), memory, and various peripheral devices for handling specific functions, such as the input/output functions of the system and direct memory access operations. These various units of the system typically communicate with each other in a bus organization. Such an organization of a microcomputer system 2 is illustrated in FIG. 1. One exemplary system could be an IBM AT desktop computer programmed to operate with an Am8052 cathode ray tube controller peripheral. A CPU 10 communicates with its peripheral devices 11, 12 and its memory unit 13 by the buses 14, 15. The buses 14, 15 are shown separately to illustrate a typical microcomputer bus organization in which the data signals are exchanged on one set of signal lines 14 while the control signals are exchanged on another set of signal lines 15.

In many, if not most, microcomputer systems 2 address signals are also communicated in the data bus 14. Thus the terms "data" or "data signals" also refer to "address" or "address signals," unless otherwise indicated.

The devices in present-day microcomputer systems 2 are typically in the form of MOS integrated circuits. MOS technology permits a higher degree of integration than bipolar technology. However, a drawback of MOS devices is that these devices are inherently unsuited for driving heavy loads, such as a microcomputer bus system.

A standard practice is to insert a bipolar buffer or transceiver circuit between the MOS device and the system buses. The buffers, having bipolar transistors, are much more capable of driving signals between the various devices of the microcomputer system. Thus the operation of the buffer is to acept a signal from its peripheral device and to generate a corresponding signal more suitable for the bus organization. Similarly, the buffer accepts signals from the bus, which may be weak, and boosts these signals for its peripheral device to receive.

However, a problem arises when the peripheral unit can operate in a "master/slave" mode. In a simple microcomputer system the CPU is the master, or initiator of operations, of the system. By control signals on the control system bus, the CPU can request data from other units which are in slave modes, or respondants to the master, for processing by the CPU. The CPU can also transfer the data to other units.

In the more sophisticated systems one of the peripheral units may also become the master of the system when the CPU relinquishes control. After the peripheral has performed its tasks, it releases control to permit the CPU to reassert itself as master, and the peripheral returns to its slave mode by which it responds to commands from the system master.

There is a problem for such a peripheral capable of operating in the master and slave modes. The device in one mode may transmit and receive data; likewise, in the second mode the device also may transmit and receive data. This requires some control logic for the bipolar buffer in order that the data signals are properly transmitted to and received from the data bus of the system. Heretofore, additional logic typically in the form of SSI (small scale integration) integrated circuits have been used to control the bipolar buffer.

Such a prior art arrangement is illustrated in FIG. 2. A bipolar buffer circuit 17 sends and receives control signals on the control signal bus path 14. Data signals are passed to and from the data bus 15. These control and data signals are relayed to a master/slave peripheral unit 20. Data signals pass directly to and from the peripheral 20 on the bipolar buffer 17. On the other hand, the control signal path is interrupted by a logic unit 16 which communicates to the peripheral 20 by a signal path 18 and to the bipolar buffer 17 by the path 19. The operation of the logic block 16 is such that upon receiving signals from the peripheral 20 from and to the path 18, the block 16 determines whether data signals will be transmitted or received by the peripheral unit 20 and accordingly sends control signals on the path 19 to the buffer unit 17 to properly enable the circuits within the unit 17 to drive the data signals between the paths 15, 23. The logic unit 16 also simultaneously allows control signals to pass along the paths 14, 18, 19 through the buffer unit 17 for the reception and transmission of control signals.

An object of the present invention is toward eliminating the logic block 16 so that a reduction in costs in the microcomputer system may be realized. No costs for the design for such a unit 16 need be incurred, and purchases of these additional SSI devices are avoided. The system is also simplified by the elimination of an additional part.

Another object of the present invention is to improve the performance of the buffer circuit by increasing its operating speed. In some cases, the response time of the buffer unit 17 is increased to speed the operations of the system.

SUMMARY OF THE INVENTION

The invention provides for an integrated circuit device having a first and second mode, a circuit for controlling external buffer circuits for driving first signals on a bus to and from the device, the circuit comprising timing circuitry for generating timing signals; a first logic unit coupled to and responsive to said timing signals and said bus control signals for generating a first transceiver control signal, including a slave mode unit responsive to signals indicative of said device states, and to bus control signals indicative of CHIP SELECT, READ/WRITE and DATA STROBE operations, said slave mode unit generating a signal active when said device has no control of said system bus and said bus control signals indicate CHIP SELECT, READ and DATA STROBE operations; a second logic unit coupled to and responsive to said timing signals and said bus signals for generating a second transceiver control signal, such that said first transceiver control signal is an enable signal for data signals to be transmitted by said transceivers from said device onto said system bus and said second transceiver control signal is an enable signal for data signals to be transmitted by said transceivers to said device from said system bus.

BRIEF DESCRIPTION OF THE DRAWINGS

A detailed understanding of the present invention may be obtained by a perusal of the following specification and reference to the following drawings:

FIG. 1 shows a generalized microcomputer system;

FIG. 2 shows the prior art relationship of a master/slave peripheral, buffer circuit and a control logic circuit for the buffer circuit to properly transmit signals to and from the peripheral unit;

FIG. 3 shows the relationship of the bipolar buffer and a master/slave peripheral unit in accordance with the present invention;

FIG. 4 illustrates the subject control circuit for the bipolar buffer in accordance with the present invention;

FIG. 5A is a detailed logic schematic diagram of the DTEN generator block control circuit in FIG. 4; FIG. 5B shows the timing of the operation of the DTEN Generator block; FIG. 5C is a logic table for a latch circuit in FIG. 5A;

FIG. 6A is a detailed logic schematic diagram of the DREN generator block in FIG. 4; FIG. 6B illustrates the timing operation of the DREN Generator block;

FIG. 7 is a detailed logic schematic diagram of a logic subcircuit of both the DTEN and DREN generator blocks;

FIG. 8A is the detailed logic schematic diagram of the state sequencer block in FIG. 4; FIG. 8B shows the timing signals of the state sequencer block;

FIG. 9 illustrates another embodiment of the subject control circuit.

DETAILED DESCRIPTION OF EMBODIMENTS OF THE INVENTION

FIG. 3 shows a master/slave peripheral unit 21 in accordane with the present invention. The peripheral unit 21 communicates to the data bus 14 and the control bus 15 through the bipolar buffer unit 17. As discussed above, bus control signals are relayed by the buffer 17 to and from the unit 21 on the data path 22. However, from these control signals the peripheral unit 21 also determines the direction of data signals to and from the unit 21. The unit sends special buffer enabling signals, DTEN and DREN, on the path 22 to the buffer 17. These signals enable the bipolar buffer 17 to relay signals from the rest of the system on the data bus 15 to the peripheral unit 21 by the data path 23 or drives data signals from the unit 21 through the path 23 and onto the data bus 15.

A schematic diagram of the novel control circuit is shown in FIG. 4. On the right side of the drawings are lines 51-55, which are part of the control signal path 22 of FIG. 3. The CHIP SELECT line 51 carries an input data which is active low (labelled as CS in the drawings). The CHIP SELECT signal indicates that the particular peripheral unit has been selected to operate by the device in charge of the bus at that time, probably the CPU.

The READ/WRITE line 52 also carries input and output signals (labelled as R/W) to and from the peripheral unit 21. During a READ operation the signal is high, and during a WRITE operation the signal is low. When the unit 21 is a master, a READ signal indicates that data or address signals will be entering the unit 21 from the rest of the system (the peripheral 21 is "reading" some other part of the system). A WRITE signal indicates that the signals will be leaving the unit 21 for storage elsewhere in the system, i.e., the unit 21 is "writing" some information into the system. On the other hand, a READ signal when the peripheral 21 is a slave implies that data signals will be leaving the unit 21 (the peripheral is being "read" by the CPU). Conversely the unit 21 will be receiving data signals if a WRITE signal appears during the slave mode of the peripheral 21. The peripheral is being "written" into by the CPU.

The DATA STROBE line 53 carries a signal which is active low (labelled as DS) and indicates that data is being transferred on the signal path 23. The DATA STROBE signal helps time the transfer of the data signals and is generated by the master device in the transfer. The peripheral unit 21 may thus generate or receive a DATA STROBE signal.

Also active low is a BUS REQUEST (BREQ) signal which is carried on an output line 54. A BUS REQUEST signal from the peripheral unit 21 indicates that the unit desires control of the bus of the system. When the CPU in charge of the system is ready to relinquish control of the bus and it passes control to the requesting peripheral unit by an active low BUS ACKNOWLEDGMENT signal (BAI), which is carried on the input line 55.

The signal lines 51-55 are connected to the rest of the peripheral unit 21, which is indicated on the left side of FIG. 4. This remaining part of the peripheral unit 21 receives these signals and generates its own signals in accordance with the operation of the peripheral unit 21. As shown by the arrowheads on the left side of the figure, the CHIP SELECT and BUS ACKNOWLEDGE input signals on lines 51 and 55 are only received by the unit 17, while the READ/WRITE and DATA STROBE may also be output signals.

The peripheral unit 21 is normally in the slave mode. It waits for signals from the master CPU and responds to those signals.

To become master of the system, the unit 21 generates a BUS REQUEST signal on the output line 54. The CPU receives the BUS REQUEST signal and in turn sends a BUS ACKNOWLEDGMENT signal to the requesting peripheral unit 21. As shown in FIG. 4 this signal is received on the input line 55. Upon receipt of the BUS ACKNOWLEDGMENT signal the peripheral unit 21 is now master of the system. By internal logic (not shown in the drawings) the peripheral unit 21 generates a signal which indicates that the unit 21 has control of the BUS. Such a signal is typically generated in peripheral units which can operate in master and slave modes to control the various operations of the peripheral unit depending upon the desired function and purpose of the unit.

For the purposes of the present invention this signal is carried on the signal line 57 and is called the GOTBUS signal. When the GOTBUS signal is high, it indicates that the peripheral unit 21 has control of the bus and is the master. When the signal is low, the peripheral unit is in a slave mode and responds to control signals from the CPU.

The signal on the line 57 enables internal output buffers 62A, 63A and 64A for the input/output lines 52, 53 and 54. Since the unit 21 is now the master, it transmits the control signals, rather than receiving them. On the other hand, when the unit 21 is not the master and the GOTBUS signal is low, the input buffers 62B, 63B and 64B are enabled since the unit 21 as a slave of the CPU will be receives control signals. The GOTBUS signals provides the control over the internal input and output buffers 62A, 62B; 63A, 63B; and 64A, 64B in the same fashion as does the DTEN and DREN signals, discussed below, over the external bipolar buffer unit 17.

The GOTBUS signal on the line 57 is also fed into the combinatorial logic blocks 40, 60. The block 40 generates the DATA TRANSMIT ENABLE (DTEN) output signal, which is active low. This signal is used to enable the output buffer to transmit data signals from the peripheral unit 21 to the rest of the system as explained previously. Similarly, the logic block 60 generates the DATA RECEIVE ENABLE (DREN) signal which is also active low. The DREN signal enables the output buffer to transmit data or address signals from the system to the peripheral unit 21.

Besides the GOTBUS signal, the DTEN generator block 40 is responsive to the READ/WRITE signal on the line 52 and the DATA STROBE on the line 53. Furthermore, the DTEN generator block 40 receives timing signals from a clock on the line 31 and state signals on the lines 32A and 32C.

The DREN generator block 60 is responsive to the control signals, CHIP SELECT on the line 51, the READ/WRITE and the DATA STROBE signals. To control its timing the logic block 60 also receives the clock signals on the line 31 and the state signals on the lines 32A, 32B and 32C.

The state signals are generated from clock signals by a state sequencer block 30 on the lines 32A, 32B and 32C for the proper ordering of functions within the peripheral unit. During each state a certain function is performed. As can be seen from the timing of signals illustrated in FIGS. 5B, 6B and 8B, each state T1, T2 and T3 occurs every third cycle of the clock signal on the line 31. Details of the block 30 are discussed later.

The circuit details of the DTEN generator logic block 40 are illustrated in FIG. 5A and the timing of the circuit shown in FIG. 5B. The block 40 is divided into two subblocks 40A, 40B. The two subblocks are shown receiving duplicate signals, such as GOTBUS; sometimes a single subblock is shown receiving the same input signal, such as CLK in the subblock 40B. This signal line replication is to facilitate a better understanding of the logic described. In the actual circuit the block 40 has a single input signal line, as shown in FIG. 4. This line is then separated into different branches to the input terminals of the subblocks 40A, 40B. This explanation is also applicable to block 60 and subblocks 60A, 60B in FIG. 6A also.

In FIG. 5A the DTEN signal on the output line 34 is connected to the output terminal of an AND gate 41 to activate the DTEN signal. Since the DTEN signal is active low, a "0" signal is required on either input to the gate 41. To obtain a "0" output signal from the subblock 40A which processes the control signals for the DTEN generator 40 in the slave mode, a NAND gate 42 which generates the output signal for the subblock 40A, requires "1" on all its input terminals. Where either the signal on the line 51 is low, i.e., the chip is selected or the GOTBUS signal on the line 57 is low, i.e., the peripheral unit 21 is in the slave mode, the NOR gate 43 has a high or "1" output signal to the NAND gate 42. The READ/WRITE signal on the line 52 is fed directly into the NAND gate 42. A "1" READ/WRITE signal indicates that the CPU is reading information from the peripheral unit 21 and the requested information is to be transmitted to the CPU. Finally, the DATA STROBE signal, which is inverted, should be is low so that requested information is correctly timed. Thus, the slave mode subblock 40A generates a DTEN signal through the AND gate 41 when all these conditions are met. If the conditions and the input signals are different, then the subblock 40A does not generate a DTEN signal.

The logic subblock 40B, on the other hand, generates a "0" signal when the peripheral is in the master mode. For a DTEN signal, the input signal to the AND gate 41 from a latch having two cross-coupled NOR gates 44, 45 must be "0". FIG. 5C shows the input and output table of the latch having its input and output signals marked in accordance with FIG. 5A. "A" and "B" mark the two input terminals and "F" shows the latch output terminal.

The B input signal to the latch is generated by logic combining timing signals CLK, T3 and condition signals GOTBUS, MRW. MRW is an internally generated signal in the peripheral 21 when the peripheral, in the master mode, must perform the READ or WRITE operation. Given the proper set of these signals, the B input signal sets the latch to generate DTEN signal through the AND gate 41. Because the internal MRW signal (and the DMRW discussed later) occurs earlier than the external READ/WRITE signal, the DTEN signal can be generated earlier then is possible using external SSI implementation, which would rely on the READ/WRITE signal.

Accordingly, a flip-flop 50 is responsive to the CLK signal on the line 31 and the third state signal T3 on the line 32C. The output signal Q2 of the flip-flop 50 is shown in FIG. 5B. The output signal Q2 is basically the inverted state signal T3 which has been delayed by half a cycle. An OR gate 49 receives the Q2 output signal and the inverted clock signal to generate an output signal Y, which is "0" during the first half of the T1 state and high at other times.

To permit these timing signal Y to pass through an NOR gate 48, the GOTBUS signal must be high or "1," along with the MRW signal. The GOTBUS signal is, in fact, high when the peripheral is in the master mode. As explained later, the MRW (MASTER READ or WRITE) signal on the line 77 is normally "1." When the peripheral unit 21 is to perform a READ or WRITE operation in the master mode, the MRW signal is low or "0." Thus, the timing signals pass through the NOR gate 48 to the B input of the NOR gate 45 of the latch. These timing signals are shown as YY in FIG. 5B.

As shown in the table in FIG. 5C, the NOR gate latch is set at the beginning of the T1 state. To reset the latch high (the ZZ signal), the A input signal to the latch is used.

Further logic in the subblock 40B combines the timing signals CLK, T1 with the GOTBUS signal. The CLK and T1 signals are combined by a flip-flop 47 to delay the T1 half a clock cycle (Q signal) and changed by AND gate 46 into the X signal which goes high at the beginning of every T2 cycle. When the peripheral 21 is in the master mode with GOTBUS signal high, the X signal passes through an OR gate 56 as the XX signal in FIG. 5B. This signal resets the latch so that the DTEN signal is active during the T1 clock state and absent at other times. When the device is in a master mode, the buffers are enabled to transmit data from the peripheral unit 21 during the T1 state.

FIG. 6A shows the detailed logic schematic of the DREN generator block 60 in FIG. 4 and FIG. 6B illustrates the timing signals. Similar to the DTEN generator block 40, the DREN output line 35 is coupled to the output terminal of an AND gate 61, which receives logic signals from the slave and master mode subblocks 60A, 60B. If any one input signal to the AND gate 61 is "0", the DREN signal is activated thereby allowing the buffer to transmit the signals to the peripheral unit.

The logic subblock 60A used to generate a "0" signal when the device is in a slave mode is similar to the subblock 40A for DTEN generation. However, for the READ/WRITE line 52 an inverter is inserted so that a "0" or WRITE signal is required. This is consistent with the WRITE operation in the slave mode since the CPU transmits data to the peripheral unit in a slave WRITE operation. Additionally, the CHIP SELECT signal must be low, i.e., the chip has been selected. The GOTBUS signal is similarly low to indicate that the peripheral unit 21 is in a slave mode. Finally, the DATA STROBE signal must be low to time the proper transmission of the data into the peripheral unit 21.

For the master mode subblock 60B, timing signals from the clock and the second and third state signals T2, T3 are used. Furthermore, the condition signals GOTBUS and DMRW are also logically combined. The CLK and T2 signals are combined by a NAND gate 68 to generate a timing signal S. This signal S is allowed through a NOR gate 67 when the GOTBUS and DMRW signals are "1" and "0," respectively. This is true when the peripheral unit 21 is in the master mode. The DMRW (delayed MASTER READ or WRITE) signal is the same as the MRW signal except for timing. This is explained later. Thus, the DMRW signal is normally high, but "0" when the peripheral unit 21 is to perform a READ or WRITE operation in the master mode.

When the peripheral unit is in the master mode and must READ or WRITE, a "0" output signal is generated by the NOR gate 67 and S timing signals appear as the SS timing signals to the latch formed by the NOR gates 66, 67. The SS signal, shown in FIG. 6B, sets the latch halfway through the T2 cycle.

The latch is reset by the input R signal from an AND gate 64 which combines timing signals CLK and T3. The combined R signal is shown in FIG. 6B. The signal rises halfway through the T3 cycle to reset the latch at this point. Therefore, in the master mode, the peripheral unit can generate DREN signals shown as the TT signal in FIG. 6B.

The MRW and DMRW generation circuit is illustrated in FIG. 7. An EXCLUSIVE NOR gate 73 receives two signals from the internal circuitry of the peripheral unit 21. One signal is the MASTER READ (MRW) signal. This signal is driven high also when the peripheral unit 21 must execute a master mode WRITE operation. The output signal of the EXCLUSIVE NOR gate 73 is the MASTER READ or WRITE signal.

This MRW signal is fed directly into the master mode operation of the DTEN generator block 40 by the line 77. The MRW signal is also fed into two serially connected flip-flops 75, 76. The two flip-flops are timed by the clock signal on the line 31 and the T1 signal on the line 32A, which signal is inverted. The resulting timing is such that whatever appears at the input D of the first flip-flop 75 will appear at the Q output of the second flip-flop 76 only during the T2 state, provided that the input signal to the flip-flop 75 appears during the immediately preceding T1 state.

FIG. 8A is a detailed logic schematic diagram of the state sequencer 30 in FIG. 4. The state sequencer 30 is formed by five serially connected flip-flop circuits 81-85. A line 59 carries a reset signal to the first flip-flop 81, 82 to clear and initialize the state sequencer. Two clock signals one the line 31 and 88 time the operation of the sequencer 30. The clock signal (CLKA) on the line 88 is identical to the clock signal (CLK) on the line 31 except for two differences.

The first difference is that the CLKA signal is slightly ahead of the CLK signal so that the flip-flops 82 and 84 follow and latch into the same states as the flip-flops 81 and 83 respectively on the rising edge of the CLK signal. If the two clock signals were simultaneous, one flip-flop would lag behind the previous flip-flop by one clock cycle. The flip-flop 85 follows flip-flop 84 with a one cycle delay due to the reception of the same clock signal but in an inverted fashion due to the inverter coupled to the input terminal of the flip-flop 85.

The second difference is that CLKA signal may be disabled so that the peripheral operations depending upon the timing of the state sequencer 30 are synchronous with other timed operations of the microcomputer system. For example, it is desirable that the CLKA signal be disabled when a control signal, such as a WAIT input-output signal, is active. The WAIT signal is found in many microcomputer systems to delay implementation of an impending operation until a present operation in the CPU or peripheral unit is complete. The CLKA signal should also be disabled when the peripheral 21 is not is a master mode since the state sequencer 30 times operations when the peripheral is in the master mode.

Each of the output signals FF81–85 of the flip-flops 81–85 are also shown in FIG. 8B. The output signals of the flip-flop 82 is also the T1 signal which appears on the signal line 32A. The T2 signal is the output signal of an AND gate 86 which combines the output signals of the flip-flops 84, 85. The flip-flops 82, 83 and 84 provide the input signals to the NOR gate 87, which generates the output signal T3 on the line 32C.

As can be seen in FIG. 8B, after one clock cycle after the state sequencer 30 is initialized and started, the T1 signal appears and is followed sequentially by T2 and T3 signals. The sequence of T1, T2 and T3 is repeated until the state sequencer is disabled.

FIG. 9 is another embodiment of the novel control circuit. Where the same elements are used as in FIG. 4, the same reference numerals are also used. In place of the DTEN and DREN signal generator blocks 40, 60, a Master Mode Logic block 90 and a Slave Mode Logic block 91 each generate a DTEN and DREN signals on lines 92 and 93 respectively.

Besides enabling the internal input and output buffers discussed previously, the GOTBUS signal on the line 57 also controls the operation of a multiplexer 33 which selects between two pairs of lines 92, 93. When the unit 21 is in the master mode, the lines 92 are coupled to the DTEN and DREN output lines 34, 35. In the slave mode, the lines 83 are coupled to the lines 34, 35.

The circuit in the slave mode operates with the combinatorial logic block 91 which receives the control signals on the READ/WRITE line 52, the DATA STROBE line 53 and the CHIP SELECT line 54. By the logical combination of these control signals, the block 91 determines whether the bus master is requesting data from the peripheral unit 21 or will transmit data into the peripheral unit 21. Upon such a determination the logic block 50 transmits either a data transmit enable signal or a data receive enable signal on one of two lines, here indicated by the reference numeral 93.

For the master mode, the combinatorial logic block 90 is used. As an initiator of operations, the peripheral unit 21 then performs operations in accordance with its clock for the proper ordering and timing of operations. The clock sends signals along the line 31 to the state sequencer generator 30 which by techniques well known in the art generates state signals, T1, T2 and T3, on signal lines collectively indicated as 32. Each state signal is an indication that a certain operation should be performed. These state signals enter the logic block 80.

Additionally, the logic block 90 is connected to the rest of the peripheral unit by the control lines 52-54 and receives control signals which are generated by the peripheral unit 21 to the rest of the microcomputer system on the control system bus 14. The logic block 90 from the signals determines whether data will pass from the peripheral unit 21 out to the data system bus 15. In such a case a DTEN signal is generated. On the other hand, if it is determined that data will be entering the peripheral unit, then a DREN signal will be generated. These two signals pass on to signal lines collectively indicated as 92.

Changes and modifications may also be made by using inverted logic, for example. Accordingly, while the invention has been particularly shown and described with reference to the preferred embodiments, it is understood by those skilled in the art that changes in form and details may be made therein without departing from the spirit of this invention. It is therefore intended that an exclusive right be granted to the invention as limited only by the meets and bounds of the appended claims.

What is claimed is:

1. In a MOS integrated circuit device for operation in a microcomputer system having a bus and bus control signals for controlling communication over said bus, said device having a master mode state indicative that said device is an initiator of operations of said system and a slave mode state indicative that said device is not an initiator of operations of said system, a circuit for controlling external bipolar transceivers for driving data signals to said device from a system bus or from said device onto said bus, comprising:

timing means for generating timing signals,
   a first logic unit coupled to and responsive to said timing signals and said bus control signals for generating a first transceiver control signal, including a slave mode unit responsive to signals indicative of said device states, and to bus control signals indicative of CHIP SELECT, READ/WRITE and DATA STROBE operations, said slave mode unit generating a signal active when said device has no control of said system bus and said bus control signals indicate CHIP SELECT, READ and DATA STROBE operations,
   a second logic unit coupled to and responsive to said timing signals and said bus signals for generating a second transceiver control signal, such that said first transceiver control signal is an enable signal for data signals to be transmitted by said transceivers from said device onto said system bus and said second transceiver control signal is an enable signal for data signals to be transmitted by said transceivers to said device from said system bus.

2. The circuit as in claim 1 wherein said first logic unit further comprises a master mode unit responsive to said timing signals, said signal indicative of whether said device has control of said system bus and a signal indicative of whether a READ or WRITE operation is to be performed by said device in a master mode, said master mode unit generating a signal active when said device is to perform a REAL or WRITE operation in a master mode and said device has control of said system bus.

3. The circuit as in claim 2 wherein said slave mode unit signal and said master mode unit signal are combined by an AND gate to generate said first transceiver control signal.

4. The circuit as in claim 2 wherein said master mode unit comprises a latch, said latch being set to generate data transmit signals by a first logic combination of said timing signals, said signal indicative of system bus control and said master mode READ or WRITE operation signal, said latch being reset by a second logic combination of said timing signals and said signal indicative of system bus control.

5. The circuit as in claim 1 wherein said second logic unit comprises a slave mode unit responsive to a signal indicative of whether said device has control of said system bus, and to bus control signals indicative of CHIP SELECT, READ/WRITE and DATA STROBE operations, said slave mode unit generating a signal active when said device has control of said system bus and said bus control signals indicate CHIP SELECT, WRITE and DATA STROBE operations.

6. The circuit as in claim 5 wherein said second logic unit further comprises a master mode unit responsive to said timing signals, said signal indicative of whether said device has control of said system bus and a signal indicative of whether a READ or WRITE operation is to be performed by said device in a master mode, said master mode unit generating a signal active when said device is to perform a READ or WRITE operation in a master mode and said device has control of said system bus.

7. The circuit as in claim 6 wherein said slave mode unit signal and said master mode unit signal are combined by an AND gate to generate said second transceiver control signal.

8. The circuit as in claim 6 wherein said master mode unit comprises a latch, said latch being set by first logic combination of said timing signals, said signal indicative of system bus control and said master mode REAL or WRITE operation signal, said latch being reset by a second logic combination of said timing signals.

* * * * *